US010289913B2

United States Patent
Wu

(10) Patent No.: US 10,289,913 B2
(45) Date of Patent: May 14, 2019

(54) TRACKING AND DETECTION FOR MOTION ESTIMATION IN REAL TIME DIGITAL VIDEO STABILIZATION

(71) Applicant: Futurewei Technologies, Inc., Plano, TX (US)

(72) Inventor: Zhenyu Wu, Plainsboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 255 days.

(21) Appl. No.: 15/137,203

(22) Filed: Apr. 25, 2016

(65) Prior Publication Data

US 2017/0309031 A1  Oct. 26, 2017

(51) Int. Cl.
*G06K 9/00* (2006.01)
*G06T 7/246* (2017.01)

(52) U.S. Cl.
CPC ..... *G06K 9/00744* (2013.01); *G06K 9/00335* (2013.01); *G06K 9/00758* (2013.01); *G06T 7/246* (2017.01); *G06T 2207/30241* (2013.01); *G06T 2207/30244* (2013.01)

(58) Field of Classification Search
None
See application file for complete search history.

(56) References Cited

U.S. PATENT DOCUMENTS 9,417,689 B1 * 8/2016 Ramaswamy ............ G06F 3/01
9,852,513 B2 * 12/2017 Wu ......................... G06T 7/215

2014/0002597 A1 * 1/2014 Taguchi ............... H04N 13/275
                                                    348/43
2017/0256065 A1 * 9/2017 Wu ........................ G06T 7/2006
2017/0309031 A1 * 10/2017 Wu ............................ G06T 7/20

OTHER PUBLICATIONS

Bouguet, Jean-Yves, "Pyramidal Implementation of the Affine Lucas Kanade Feature Tracker Description of the algorithm", Intel Corporation, [online]. Retrieved from the Internet: <URL: http://robots.stanford.edu/cs223b04/algo_affine_tracking.pdf>, (2001), 1-10.
Shi, et al., "Good Features to Track", *IEEE Conference on Computer Vision and Pattern Recognition (CVPR94)*, Seattle, WA, (Jun. 1994), 593-600.

* cited by examiner

*Primary Examiner* — Tahmina N Ansari
(74) *Attorney, Agent, or Firm* — Vierra Magen Marcus LLP

(57) ABSTRACT

A method includes obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold. Motion filtering may be performed by buffering a homogenous transformation of the global motion estimation, calculating a geometric mean of the buffered motions, and estimating intentional camera trajectory based on the geometric mean.

19 Claims, 6 Drawing Sheets

TRACKING AND DETECTION FOR MOTION ESTIMATION IN REAL TIME DIGITAL VIDEO STABILIZATION

FIELD OF THE INVENTION

The present disclosure is related to digital video stabilization and in particular to tracking feature points and motion filtering for real time digital video stabilization.

BACKGROUND

Video stabilization is used to remove unintended annoying vibrations occurred during video capturing. Digital video stabilization involves estimating camera motion trajectory and subjecting it to a filtering process to eliminate any motion jitter, in order to produce smooth and stabilized video output. In particular, camera motion trajectory is obtained by estimating the so-called "global motion" between two input video frames consecutively in time.

Global motion estimation depicts how the camera body moves between a pair of input frames, based on the estimated displacement between corresponding points from the two frames. If the global motion is represented by a motion model, the model needs to be estimated, usually in the form of a transformation matrix. Generally, there are two stages involved in global motion estimation, displacement estimation that generates two sets of mapped points, followed by model estimation. The calculations involved in global motion estimation can be quite complex and resource consuming.

Filtering removes parasitic vibration and can help make output video appear smooth by calculating a so-called stabilization matrix. The stabilization matrix may be applied to corresponding video frames within a frame synthesizer to temporarily realign the frame. Prior filters are fairly complex, and also consume significant resources.

SUMMARY

A method includes obtaining two consecutive video frames at a global motion estimation function for execution on a processor, wherein the video frames comprise a current video frame and a previous video frame and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold.

A computer readable storage device has instruction stored thereon for execution by a computer to perform operations. The operations include obtaining two consecutive video frames at a global motion estimation function for execution on a processor, wherein the video frames comprise a current video frame and a previous video frame and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold.

A system includes processing circuitry and a storage device coupled to the processing circuitry. The processing circuitry is configured to perform operations including obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold.

A method includes buffering a homogenous transformation of global motion between pairs of consecutive frames of video from a camera, calculating a geometric mean of the buffered motions, and estimating intentional camera trajectory based on the geometric mean.

A computer readable storage device has instruction stored thereon for execution by a computer to perform operations. The operations include buffering a homogenous transformation of global motion between pairs of consecutive frames of video from a camera, calculating a geometric mean of the buffered motions, and estimating intentional camera trajectory based on the geometric mean.

A system includes processing circuitry and a storage device having a buffer coupled to the processing circuitry. The processing circuitry is configured to perform operations including buffering a homogenous transformation of global motion between pairs of consecutive frames of video from a camera, calculating a geometric mean of the buffered motions, and estimating intentional camera trajectory based on the geometric mean.

A method includes obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold. Motion filtering is performed by buffering a homogenous transformation of the global motion estimation, calculating a geometric mean of the buffered motions, and estimating intentional camera trajectory based on the geometric mean.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Stabilization of an input video from a shaky camera is described in general followed by detailed descriptions of a three state machine for maintaining a set of tracked feature points for providing global motion estimation and a description of a motion filter to remove jitter in stabilized video as well as estimating and following long-term intentional camera motion trajectory.

Video stabilization is used to remove unintended annoying vibrations occurred during video capturing. This is sometimes referred to as shakiness of the camera by a user. Digital video stabilization relies on estimating camera motion trajectory and subjecting it to a filtering process to eliminate motion jitter, in order to produce smooth and stabilized video output. In particular, camera motion trajectory is obtained by estimating the so-called "global motion" between two input video frames consecutively in time. A global motion depicts how the camera body moves between a pair of input frames, based on the estimated displacement between corresponding points from the two frames. And if the global motion is represented by a motion model, the model needs to be estimated, usually in the form of a transformation matrix.

Figure 1:
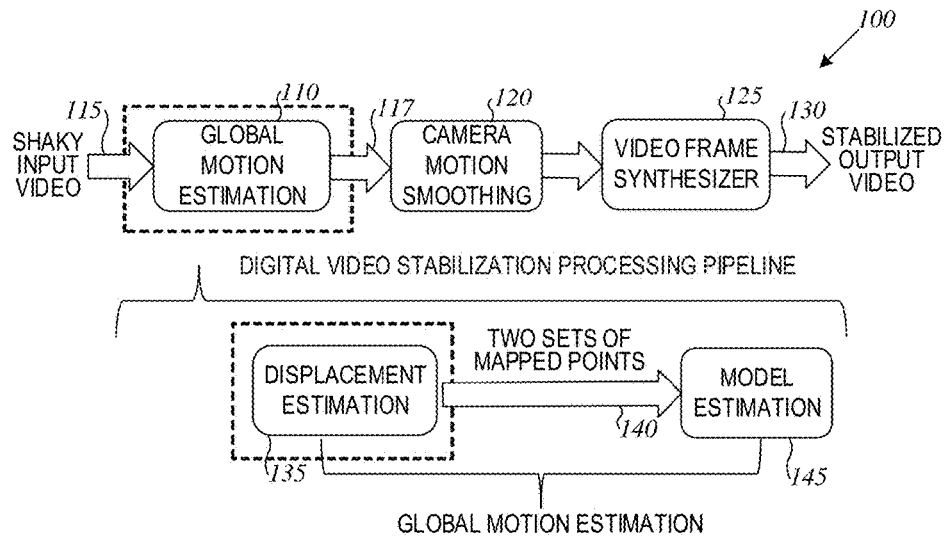
FIG. 1 is a block flow diagram of a processing pipeline showing three stages of digital video stabilization according to an example embodiment.

FIG. 1 is a block flow diagram of a processing pipeline 100 showing three stages of digital video stabilization. In one embodiment, the pipeline 100 is a two dimensional (2D)-based digital video stabilizer pipeline generally consists of three top-level modules. A first stage is a global motion estimation stage or module 110 that receives consecutive frames of shaky input video, such as that from a hand held video camera. Roughly speaking, global motion estimation 110 estimates a global motion between each pair of consecutive video frames, which together form the camera motion trajectory, and provides a motion model as output 117.

A second stage is referred to as a camera motion smoothing stage or module 120 that includes a motion filter that operates on the motion model 117. In video stabilization applications, the trajectory contains high-frequency motion jitters, and a goal of the motion filter is to remove such parasitic vibration and make the output video look smooth by calculating a so-called stabilization matrix, which is applied to the corresponding video frame within a video frame synthesizer stage or module 125 to temporally realign the frame to provide stabilized output video at 130.

The global motion estimation in one embodiment includes two stages, a displacement estimation module 135 that provides two sets of mapped points at 140 to a model estimation module 145.

There are a number of challenges in estimating global motion. First of all, as global motion describes the motion of the camera itself in video stabilization, any moving object in the camera view is regarded as interference and thus needs to be suppressed. Second, during the capturing, a camera view may change. Objects can move in and out of view responsive to such change. An estimation scheme should be resilient to different occlusion and unblocking situations. Third of all, motion estimation often takes the majority of the processing time in a digital video stabilizer. So its complexity should be low, especially for a real-time video stabilizer.

Among a number of viable techniques for displacement estimation in global motion estimation, feature points based tracking proves to be attractive for a number of reasons. For example, compared to block matching and feature points matching schemes, it has lower complexity. Furthermore, tracking can exploit the temporal correlation between video frames. However, if used non-discretionally, it may also suffer problems, including loss of track, skewed spatial distribution of tracked feature points, etc. So, there is a need to customer-design a feature point based tracking scheme for global motion estimation in digital video stabilization.

Figure 2:
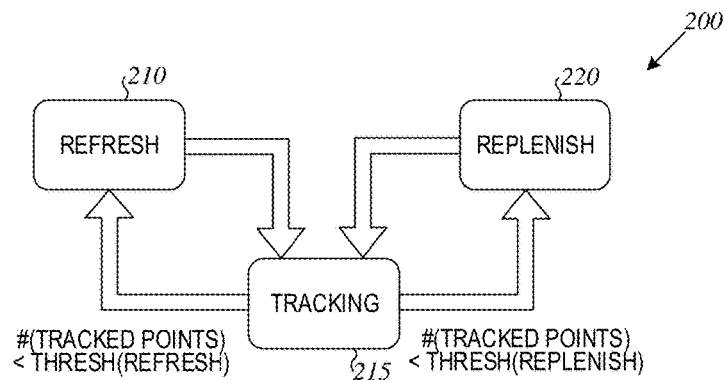
FIG. 2 is a diagram of a state machine for implementing a method that uses feature points based tracking, and a detection scheme provides global motion estimation in a digital video stabilizer according to an example embodiment.

FIG. 2 is a diagram of a state machine 200 for implementing a method that uses feature points based tracking, and a detection scheme provides global motion estimation in a digital video stabilizer. Based on state machine 200, the method effectively exploits temporal correlation between video frames through managing the size and distribution of tracked feature points, with a goal of improving the robustness and accuracy of estimating global motion. Due to its tracking nature, the state machine 200 also enjoys a lower complexity compared to other popular techniques, which greatly benefits its deployment to any application with real-time requirement.

In various embodiments, feature points may comprise a pixel or pixels that are recognizable by a programmed processor and may be selected such that the feature points are not visible to a person viewing the video. The number of feature points may vary as a function of the number of pixels in the frames of the video. Some typical ranges of desired feature points, referred to as a target number of feature points, include 400 feature points for frames of 1920×1080, 500-600 feature points for 4K displays, and 200 or so feature points for 1280×720 frames.

The state machine 200 includes three internal states, namely a refresh state 210, a tracking state 215, and a replenish state 220. Based upon a number of tracked feature points, the state machine 200 chooses to dwell in a state or switch to another before estimating the displacement between two consecutive input video frames. The state machine 200 implements control by using two thresholds, a thresh(refresh) and a thresh(replenish). A typical value for thresh(refresh) may be about $\frac{1}{5}^{th}$ to $\frac{1}{6}^{th}$ of the target number of feature points for different resolution frames. A typical value for thresh(replenish) may be about ½ of the desired number of feature points for different resolution frames. Note that the thresholds may be varied outside the example ranges provided in further embodiments.

The state machine 200 remains in tracking state 215 under normal conditions, where the size of tracked feature point population is greater than both thresholds, thresh(refresh) and thresh(replenish). Upon entering the tracking state 215, the feature points from the previous frame serve as the input, and the method employs a feature point tracking algorithm to track those points to the current frame, therefore to establish the displacement correspondence as the output of the displacement estimation module 135. The output mapping between the two sets of feature points is then passed to the model estimation module 145 to derive the motion model 117.

If the number of tracked points to the current frame fall below thresh(refresh), a failure is declared and the following model estimation processing is skipped. That happens usually when there is a complete/partial scene change or a large camera motion. Due to various reasons such as occlusion, changes in lighting conditions, etc., more points may gradually get lost over time. Various tracking algorithms may be used, such as for example a Lucas-Kanade sparse optical flow based tracking.

A refresh state 210 is switched to whenever the number of tracked feature points falls below thresh(refresh). That includes cases such as scene changes and big motions, as well as the beginning of the video, where there are no existing feature points.

In one embodiment, there is no input to the refresh state, and the refresh state may be entered initially with the start of receipt of video frames. Upon entering the refresh state, the method first discards any remaining tracked feature points, if any. Then the method applies a feature detection algorithm to a buffered previous frame to generate a target population, G, of new feature points, where its target population size is denoted as G(init). If there are not enough detected feature points, i.e. G<thresh(refresh), a failure is declared, and the following model estimation step is skipped. Otherwise, the same tracking algorithm is invoked to track down those feature points to the current frame. The established displacement correspondence between the two sets of the feature points is output to the model estimation module 145.

The refresh state 210 is introduced to handle cases such as big scene changes or large motions, to restart the tracking process. Therefore, thresh(refresh) is usually set low enough so that the refresh state 210 is entered in those rare occasions and a reliable model estimation is very unlikely. Many different feature detection algorithms may be used, such as for example a Tomasi-Shi feature point detector.

A normal tracking method may suffice for the tracking and refresh states. However, there is always a gap between the initial population G(init) of feature points to start the tracking, and the threshold thresh(refresh) where there are not a sufficient number of tracking points so that a new population of tracking points should be found.

If thresh(refresh) is set low, the motion estimator 110 may operate on an insufficient number of feature points so that the accuracy of the estimated motion model 117 is compromised. On the other hand, if thresh(refresh) is set too high, then those well-tracked feature points may get tossed away frequently, which is imprudent in video stabilization. This is because the global motion estimation module 110 seeks to estimate a global motion due to camera body motion. In that regard, static background in the scene provides the ground truth and the feature points from there tend to be tracked much longer than those from moving foreground objects. So a frequent restart disrupts the propagation of those valuable background feature points, therefore degrades the quality of the feature point population.

To address that problem, the replenish state 220 is used. The replenish state 220 is entered as a function of the threshold thresh(replenish) that is set in the middle of G(init) and thresh(refresh). The replenish state 220 is designed to add more new feature points to the population before it drops too low to trigger the refresh state 210. That helps to retain valuable feature points from static background, which are often well tracked. The replenish state 220 may also discover new scene areas due to camera view change etc., and populate those areas with new feature points to maintain as much as possible an evenly distributed feature point set across a frame. A mask may be used to select the new feature areas, such as by masking out areas containing the valuable feature points. The replenish state 220 may further maintain a large tracked feature point population to improve the accuracy of the model estimation, as well as the robustness against foreground object interference.

The input to the replenish state 220 is a tracked feature point set with its size G(Replenish) between thresh(refresh) and thresh(replenish). Once in the state, the method sets out to first replenish the population by adding at least [G(init)– G(Replenish)] new feature points from the buffered previous frame. It is done by deploying the feature detection algorithm, but in a partial manner The detector may be configured to look only at the areas in the previous frame outside the neighborhood of any existing feature point. The neighborhood may be defined by a radius from the existing feature point defining a circle around the feature point, or a polygon in various embodiments. Looking outside the neighborhood of existing feature points may result in more new feature points originating from scene areas not already well covered. After the population is recovered, the method then applies the tracking algorithm to track the feature points in the current frame. The displacement correspondence between the two sets of feature points is finally output to the model estimation module 145 to process.

The replenish state 220 helps to ensure a high concentration of feature points in relatively static portions of a scene as compared to the rest of the scene. Therefore, the feature points coming from that area gradually dominate the population over an extended period of time, with feature points from other areas becoming extinct. That skewed distribution may be detrimental to global motion estimation because a concentrated feature point population may fail to capture the global motion across the frame.

The length of time the state remains in tracking state 215 is recorded in one embodiment. Once the length of time is beyond a certain length, such as for example two seconds or 60 frames in a 30 frame per second video, a portion of the feature point population is randomly discarded to trigger the method to enter replenish state 220 in the next frame, where new feature points can be added to the population from other areas. The portion may be selected to minimize disruption to the viewing of the video.

The portion of tracked feature points that are randomly discarded are discarded are replaced with newly detected/tracked feature points. Such replacement doesn't affect video viewing. The portion discarded and replaced should be large enough to make a meaningful difference so that static portion related feature points do not dominate the set of feature points. But setting it too high can also sacrifice too many tracked feature points. In one embodiment, 50% of the feature points are discarded and replaced once the length of time is beyond the certain length. Other percentages and times may be used in further embodiments.

Compared to a two-state tracking scheme, with the introduction of the third replenish state, thresh(refresh) is set to the low end in some embodiments. The value of thresh (replenish) can be set as an algorithm parameter. A higher thresh(replenish) triggers more frequent partial detection, which should help global motion estimation but at the cost of higher complexity, and vice versa.

The motion filter of camera motion smoothing module 120 determines how the camera's view traverses through a scene in order to achieve a smooth viewing experience. An effective motion filter should first be able to extract the underlying camera motion from possibly noisy estimated global motions from global motion estimation. Then it should perform the so-called "path planning" to select a smooth camera path along the camera's intentional motion trajectory, in order to remove annoying high-frequency motion jitters. Lastly video stabilization usually involves spatial resolution loss, which should also be considered by the motion filter, with the purpose of achieving the maximum smoothness with a given loss limit.

For a real-time digital video stabilizer, motion filtering is particularly challenging because it can only access motion information from the current and past video frames. So the motion filter should optimize a camera path on the fly and adapt quickly to camera motion changes.

The motion filter in various embodiments is suitable for real time video stabilization applications. That is, it can provide filtering functions quickly to allow for the provision of stabilized output video to a user of a camera that has minimal delay that may be imperceptible to the user. The motion filter can process and output video on the fly, relying only on the motion information from the current and some past video frames. It can effectively eliminate or dampen annoying vibrations appearing in a video capture, while following the intentional camera motion trajectory. In addition, the motion filter is able to adapt quickly to sudden changes in the camera's motion directions, in order to avoid over-stabilization, which may lead to image distortion artifacts. Finally, a mechanism is introduced to adjust smoothing strength of the motion filter to meet a resolution loss limit.

Due to its real time nature, the motion filter relies on current and past frames to estimate the underlying long-term camera motion. To that end, the module maintains an internal fixed-length buffer in a sliding window manner to store the estimated global motions associated with or between consecutive frames. Specifically, each time when an estimated global motion corresponding to the latest input frame becomes available by global motion estimation, it is appended to the buffer, while the first (and the oldest) motion in the buffer is moved out.

Each global motion in the buffer is in the form of a 3×3 matrix that represents a homogeneous transformation in general (or a degenerated form such as affine, similarity, translation, etc.) The length of the motion buffer is denoted as L, and the motion model associated with frame i as $M_i$. The accumulated motion from the first to the last frame in the buffer is $$\tilde{M} = M_0 \times M_1 \times \ldots \times M_{L-1} = \Pi_{i=0}^{L-1} M_i \qquad \text{Eq. 1}$$

The geometric mean of $\tilde{M}$, is:

$$\overline{M} = \sqrt[L]{\tilde{M}} = \sqrt[L]{\prod_{i=0}^{L-1} M_i} \qquad \text{Eq. 2}$$

where $\overline{M}$ represents the average motion for each frame in the buffer.

When the buffer is set long enough, the geometric mean can reliably approximate the underlying long-term motion during the buffer time. This is because camera shakiness tends to be random, high-frequency motions. The average taking place in Eq. 2 is in fact a low-pass filtering process, which can remove such short-term components. In addition, taking the average helps mitigate the noise stemming from global motion estimation because such noise is also randomly distributed. Based on the two observations, by calculating a geometric mean of the buffered motions whenever for each video frame, a continuous estimation of the intentional camera motion trajectory can be obtained. In fact it is also the main source of smoothing within the invented motion filter.

In practice, however, taking the root of a 3×3 matrix of arbitrarily length L is not a trivial task, and its complexity soon grows unmanageable when L is greater than 3. To circumvent the numerical difficulty, simplification of the computation may be made so that the computation is not only feasible but also light-weight. In one embodiment, the motion model used in the filtering process is an affine transformation, i.e.

$$\begin{bmatrix} a & b & x \\ c & d & y \\ 0 & 0 & 1 \end{bmatrix} \qquad \text{Eq. 3}$$

In the affine transformation form, the coefficients a and d correspond to the scaling factor of the transformation, which are near 1 in practice due to the limited zooming motion that occurs during normal video capturing. Likewise, coefficients c and d determine the amount of rotation (assuming a and b are close to 1) and shearing effect of the transformation, which are usually very close to 0. In comparison, coefficients x and y represent horizontal and vertical translations respectively but can take values in a much wider range, especially when a camera panning occurs.

Suppose M' is the square root of an affine transformation M, i.e., $$M' \times M' = M \qquad \text{Eq. 4}$$

In more detail, $$\begin{bmatrix} a & b & x \\ c & d & y \\ 0 & 0 & 1 \end{bmatrix} \times \begin{bmatrix} a & b & x \\ c & d & y \\ 0 & 0 & 1 \end{bmatrix} = \begin{bmatrix} a^2 + bc & ab + bd & ax + by + x \\ ac + cd & bc + d^2 & cx + dy + y \\ 0 & 0 & 1 \end{bmatrix} \approx \qquad \text{Eq. 5}$$

-continued $$\begin{bmatrix} a^2 & ab+bd & ax+x \\ ac+cd & d^2 & dy+y \\ 0 & 0 & 1 \end{bmatrix} = \begin{bmatrix} m_{00} & m_{01} & m_{02} \\ m_{10} & m_{11} & m_{12} \\ 0 & 0 & 1 \end{bmatrix}$$

By exploiting the above numerical observations about the coefficients of the transformation, some of the product terms containing the coefficients of b and/or c in M'×M' may be safely ignored because of their numerical insignificance. Comparing the two sides of the $2^{nd}$ row in Eq. 5, the following relationship to calculate all the coefficients in M' is obtained:

$$a = \sqrt{m_{00}}$$
$$b = m_{01}/(a+d)$$
$$x = m_{02}/(1+a)$$
$$c = m_{10}/(a+d)$$
$$d = \sqrt{m_{11}}$$
$$y = m_{12}/(1+d)$$

Eq. 6

Another important observation is that the square root of an affine transformation is still affine, so that the process can be carried out repeatedly. So if the length of the buffer is set to be a power of 2 (e.g., 8, 16, 32, 64, 128, etc.), its geometric mean can be easily calculated using the above equations iteratively.

Adaptive filtering for camera motion change is now described. A low-pass filter based on geometric average may be used to smooth the estimated global motion. However, because of its real-time nature, the filter operates based on the current and past motion samples without the knowledge about what the future camera motion would be. If the camera experiences a sudden change in its intentional motion trajectory, past motion samples from old trajectory still remaining in the buffer may impact the incoming samples from the new trajectory in their filtering process. That may lead to disturbing distortion artifact in the realigned output video frames during the transition period. The artifact is exacerbated when the directions of two trajectories are very different.

Figure 3:
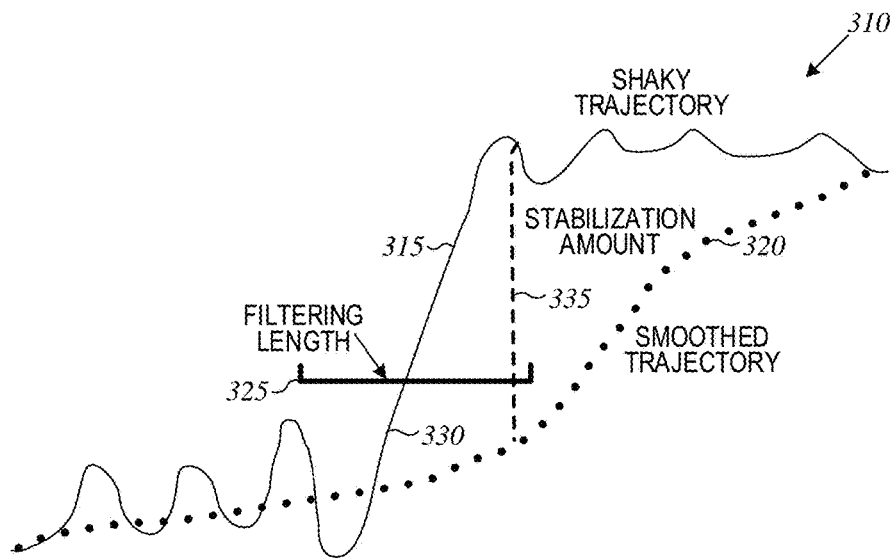
FIG. 3 is a graph illustrating camera position versus time for a long filter length according to an example embodiment.

Such an effect is illustrated in graph form in FIG. 3 generally at 310 using a simplified one dimensional (1D) example showing camera position versus time. An adaptive filter may be used to resolve the problem. The actual camera angle motion is represented by line 315, while a smoothed trajectory is indicated by broken line 320. In the lower left part of the graph, the actual camera motion 315 represents jitter or shakiness of the camera that is nicely smoothed out by the filter. A filtering length is illustrated at 325, and represents a longer length of the filter that includes many historical frames. At 330, the actual camera movement quickly changes. Since the filter length is long, the smoothed trajectory 320 changes slowly, deviating significantly from the intended camera motion as indicated at stabilization amount 335. It takes the smoothed trajectory 320 a significant amount of time to track back to the intended camera angle.

Figure 4:
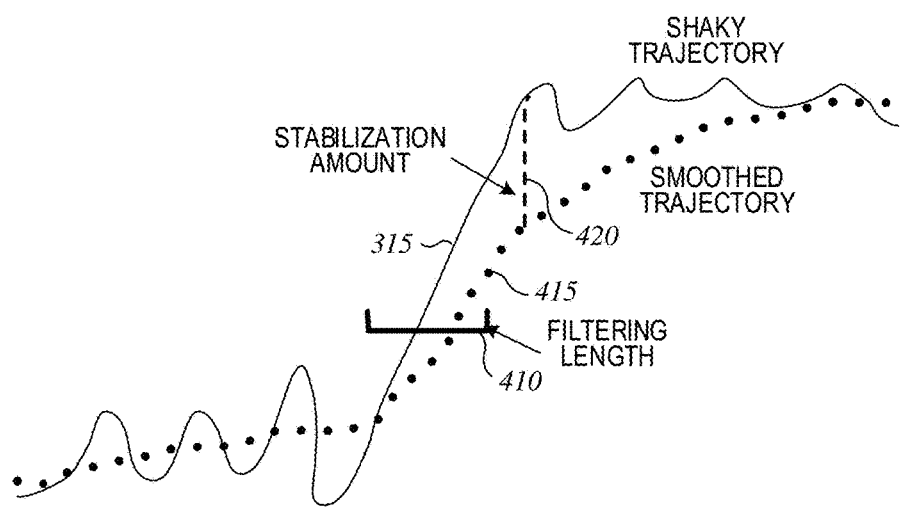
FIG. 4 is a graph illustrating camera position versus time for a shorter filter length according to an example embodiment.

FIG. 4 is a graph illustrating the same camera angle motion 315 with a shortened filtering length 410, resulting in a closer tracking of the smoothed trajectory 415 and a decrease in the largest stabilization amount 420. By shortening the filter length 410, the smoothed trajectory 415 tracks more closely with the actual camera angle motion 315.

Because it is hard to quantify what a "new" motion trajectory is, the problem is addressed by preventing over correction. The low-pass filter may have its strength controlled by the length of its geometric averaging, i.e., more averaged samples leads to a stronger filter. So, to make the filter adaptive, all it takes is to change the number of samples involved in an average. To determine the right amount of motion samples participating in the average for each frame, the process starts from the default (and the longest) filtering length L, which is a power of 2 as described above. At that length, the geometric average is calculated by taking the most recent L motion samples in the buffer, and then the average is used to obtain a tentative stabilization matrix M(L), as will be described later. Once M(L) is ready, it is compared to a predetermined set of warping thresholds. If all the coefficients of M(L) is within the thresholds, L becomes the final filtering length for that frame. Otherwise, L is set to its half (i.e., L=L/2) and the above process is repeated. The process terminates ultimately when L reaches 1, which means no averaging takes place.

In one embodiment, the length of the filter may be set from 1 to 32 (corresponding to around one second for 30 frames per second (fps) video). The upper bound can be adjusted based on the frame rate of the video. For example, a high speed video (120 fps) may utilize an upper bound length of 128, while a low speed video (15 fps) may utilize a length of 16.

For the affine model, the set of warping thresholds consists of the limits including scaling coefficients (a and d), rotation and skew coefficients (b and c) from Eq. 3, as they are deemed as the primary sources of distortion artifact.

The set of warping thresholds may be set empirically and may have different classes corresponding to the amount of motion the camera is expected to endure. In one embodiment, there are three classes: slow motion/normal motion/high motion. Slow motion has the smallest thresholds (distortion tolerance), and high motion has the largest thresholds. For the normal motion class, there are three constraints: (1) $0.95 <= m00$, $m11 <= 1.05$ (zoom limit), (2) $abs(m01)$, $abs(m10) <= 0.025$ (rotation limit), and (3) $\max(abs(m01/m10), abs(m10/m01)) <= 10.0$ (skew limit)

Once the filter's length is shortened at an input frame, it needs to be recovered to its normal length afterwards. Comparing to the shortening process that occurs on one motion sample, the recovery process happens more gradually spanning multiple ones. Suppose the recovery starts from a shortened filtering length L'. In the process, it is only extended to 2L' when L' more new motion samples are appended to the buffer. That means all the samples from (L'+1) to (2L'−1) are still filtered at length L'. That practice ensures that the filter only uses samples from the new motion trajectory to avoid distortion artifacts during the transition period.

The recovery process terminates when L' reaches the normal filtering length L. However, during the recovery process, each motion sample is still subject to the threshold checks and if any of the thresholds is violated, the recovery is interrupted and the shortening process begins immediately at the filtering length L'.

Long-term camera motion estimation is performed by applying a geometric average based adaptive low-pass filter to the original shaky camera motion trajectory. With the estimated long-term motion, the next step is to rectify input video frames to eliminate or dampen any camera shakiness.

To that end, the motion filter maintains two 3×3 transformation matrices $\tilde{M}_n$ and $\overline{\tilde{M}}_n$ throughout a stabilization matrix calculation process. Among them, $\tilde{M}_n$ is the accumulated original motion defined as:

$$\tilde{M}_n = M_0 \times M_1 \times \ldots \times M_{n-1} = \Pi_{i=0}^{n-1} M_i \quad \text{Eq. 7}$$

where $M_i$ is the estimated global motion from global motion estimation associated with original input frame i. Therefore, $\tilde{M}_n$ represents the accumulated relative motion between frames 0 and (n−1). Likewise, $\overline{\tilde{M}}_n$ is accumulated long-term motion defined as $$\overline{\tilde{M}}_n = \overline{M}_0 \times \overline{M}_1 \times \ldots \times \overline{M}_{n-1} = \Pi_{i=0}^{n-1} \overline{M}_i \quad \text{Eq. 8}$$

where $\overline{M}_i$ is the filtering result of the long-term camera motion associated with frame i. Thus $\overline{\tilde{M}}_n$ keeps track of the accumulated long-term motion between frames 0 and (n−1).

Denote $\hat{M}_i$ as the stabilization matrix, which warps frame i in order to temporally align it with the underlying long-term motion at its time instant. Ideally $\hat{M}_i$ should be set to the difference between $\tilde{M}_n$ and $\overline{\tilde{M}}_n$ in the transformation sense:

$$\hat{M}_i = \overline{\tilde{M}}_i / \tilde{M}_i \quad \text{Eq. 9}$$

If $\hat{M}_i$ is used to warp frame i, then the frame will be aligned with frame 0. Eq. 9 works well as long as the camera does not change its views.

Figure 5:
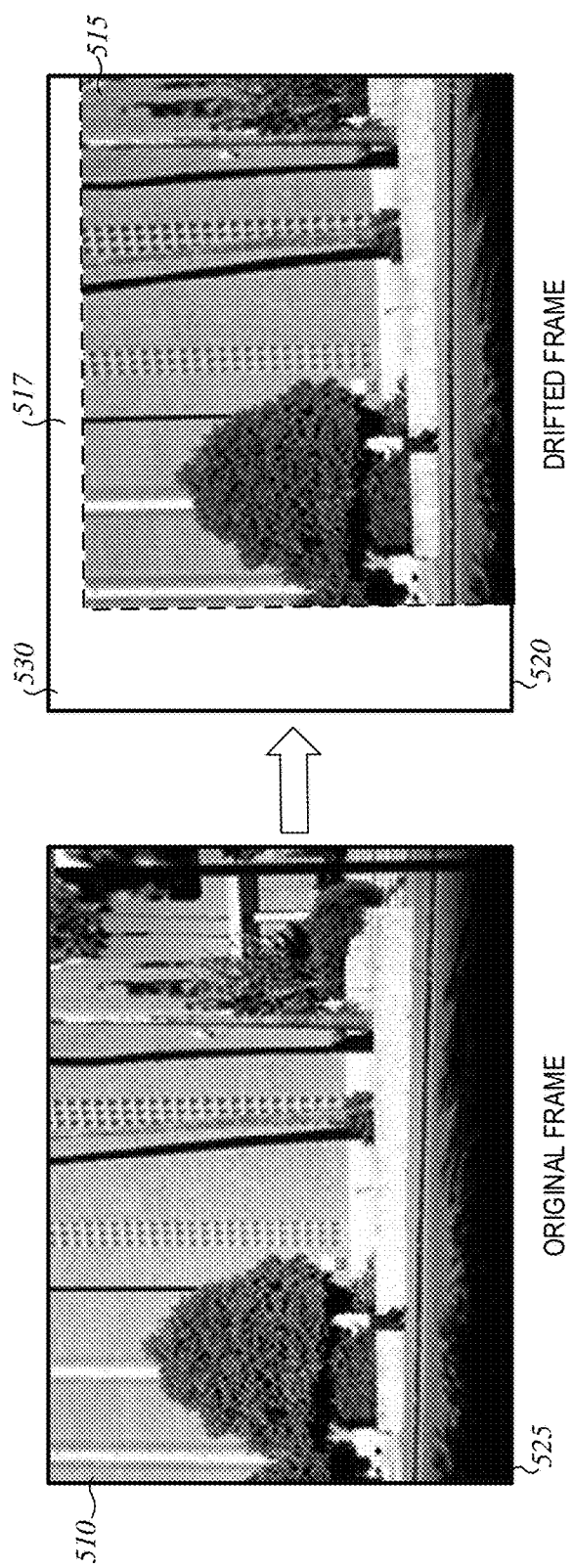
FIG. 5 is a comparison of an original frame and a drifted frame illustrating a drifting artifact according to an example embodiment.

However, it is rarely the case in practice. In video stabilization's terminology, a frame used as the reference for later frames to align with is called an "anchor" frame. If one frame is selected as a constant anchor frame, then the subsequent stabilized frames may suffer the so-called "drifting" artifact, as shown in FIG. 5, where part or the entire realigned frame may be out of sight due to changes in camera views. An original frame is indicated at 510, with a drifted frame indicated at 515. A broken line 517 is used to outline a portion of the image in the original frame that is still visible in the drifted frame 515. The drifted frame 515 includes a portion 520 that has no image source available to display and may appear dark on an actual image. The drifted frame 515 is also missing a portion 525 from the original frame 510, corresponding to the right side of the frame 510. The missing portion is referred to as the drifting artifact. Note also, that the drifted frame includes a top portion 530 that has no image source available, and a corresponding portion of the image source is missing from the bottom of drifted frame 515.

To counter the "drifting" artifact, the anchor frame needs to be updated with the camera view. One straightforward way is to periodically assign a recent input frame as the new anchor. But that approach can lead to unsmooth motion appearance as the anchor itself may be involved in some vibration. In this invention, with the introduction of the two accumulative motion matrices $\tilde{M}_n$ and $\overline{\tilde{M}}_n$, a different update scheme is adopted. In the scheme, a coefficient a called "forgetting factor" is used to diminish the impact from previous motion samples on the stabilization matrix $\hat{M}_i$. In particular, after $\hat{M}_{i-1}$ is calculated by Eq. 8 for frame (i−1), both $\hat{M}_{n-1}$ and $\overline{\tilde{M}}_{n-1}$ are updated according to $$\tilde{M}_i = (1-\alpha)\tilde{m}_{i-1} + \alpha I$$

$$\overline{\tilde{M}}_i = (1-\alpha)\overline{\tilde{M}}_{i-1} + \alpha I \quad \text{Eq. 10}$$

for frame i, where $\alpha \in [0,1]$ and I is the 3×3 identity matrix. In Eq. 10, we can see that when α is set to 0, the two matrices remain unchanged after the update. Together with Eq. 9, it means the anchor frame is kept the same when calculating the stabilization matrix $\hat{M}_i$. On the other extreme, when α equals to 1, the two accumulative matrices are reset to identity matrix, which means all the accumulated motion in the past is discarded. That effectively sets the previous frame (i−1) as the new anchor. With a value of α in between, Eq. 10 gradually discounts more for the motion effect from older frames in the past due to its recursive nature, and thus giving more weight to the more recent input frames. That effectively accomplishes the goal of update the anchor but in a more continuous and controllable way.

In one embodiment, α is set according to how fast a scene moves out of the camera view, with a default minimum to reflect the nature turbulence in camera views. Based on the observation that the translation coefficients x and y in Eq. 3 generally dominate the speed, a is set in linear proportion to the pair of values.

In digital video stabilization, frames are rectified at the cost of spatial resolution loss. In general, more loss tolerance allows a more stabilized video output. However, there often exists an upper limit as how much resolution loss one can accept. So a motion filter should take that limit into account when performing its path planning. In one embodiment, the real-time motion filter provides a more stabilized output on the fly, such as in real time corresponding to the capture of the video so a user can see what is being captured while it is being captured. The time to perform the video processing should be short enough to be not visually disturbing to the user. Less than one second may be desired in one embodiment, with even less time being more desirable.

In one embodiment, resolution detainment takes place after the adaptive filtering and drift compensation, where a tentative stabilization matrix $\hat{M}_i$ is obtained. The filter applies $\hat{M}_i$ to the four corners of the frame to check whether or not the mapped frame encloses the rectangle corresponding to the output frame with reduced resolution. If so, $\hat{M}_i$ becomes the final stabilization matrix. Otherwise, the filter attenuates $\hat{M}_i$ by an amount determined by a coefficient β. The attenuation operation is similar to Eq. 10, expect β replaces α there and the motion model now is $\hat{M}_i$. β starts from 0 and is incremented by a small step each time until the loss constraint is satisfied, or it reaches its upper bound 1, which means no warping to the original input frame.

Figure 6:
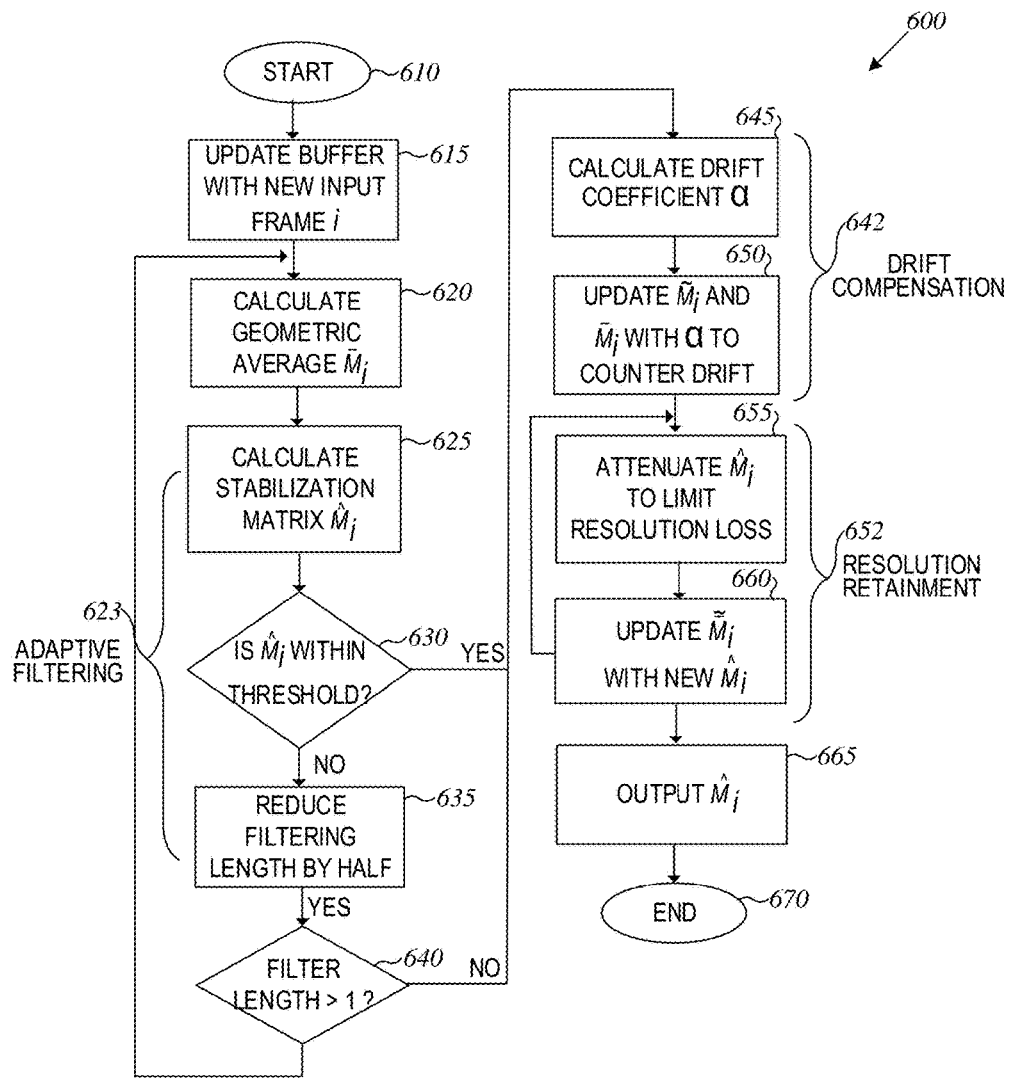
FIG. 6 is a flowchart illustrating a method performed by low pass filtering according to an example embodiment.

FIG. 6 is a flowchart illustrating a method 600 performed by low pass filtering utilizing the above calculations and process previously described in more detail. Method 600 starts at 610 and updates a buffer at 615 with a new input frame, i, from camera video. At 620, a geometric average is calculated.

Method 600 then performs adaptive filtering 623 that includes elements 625, 630, and 635. At 625, a stabilization matrix is calculated and at 630, it is determined whether or not the stabilization matrix is within a threshold. If not, the filtering length is reduced by half at 635. If the filter length is still greater than 1 at decision block 640. If yes, a new geometric average is calculated at 620 and adaptive filtering 623 is performed again with the new filter length.

If the filter length is not greater than one, or if the stabilization matrix is within the threshold, drift compensation is performed at 642 using the existing filter length. At 645, a drift coefficient, also referred to as a forgetting factor is calculated. The geometric average is then updated at 650 as is the stabilization matrix with the drift coefficient.

Processing then proceeds to resolution retainment at 652 wherein the stabilization matrix is attenuated at 655 to limit resolution loss. At 660, the geometric mean is updated with the new stabilization matrix. The stabilization matrix is then output at 665, and method 600 ends at 670.

Figure 7:
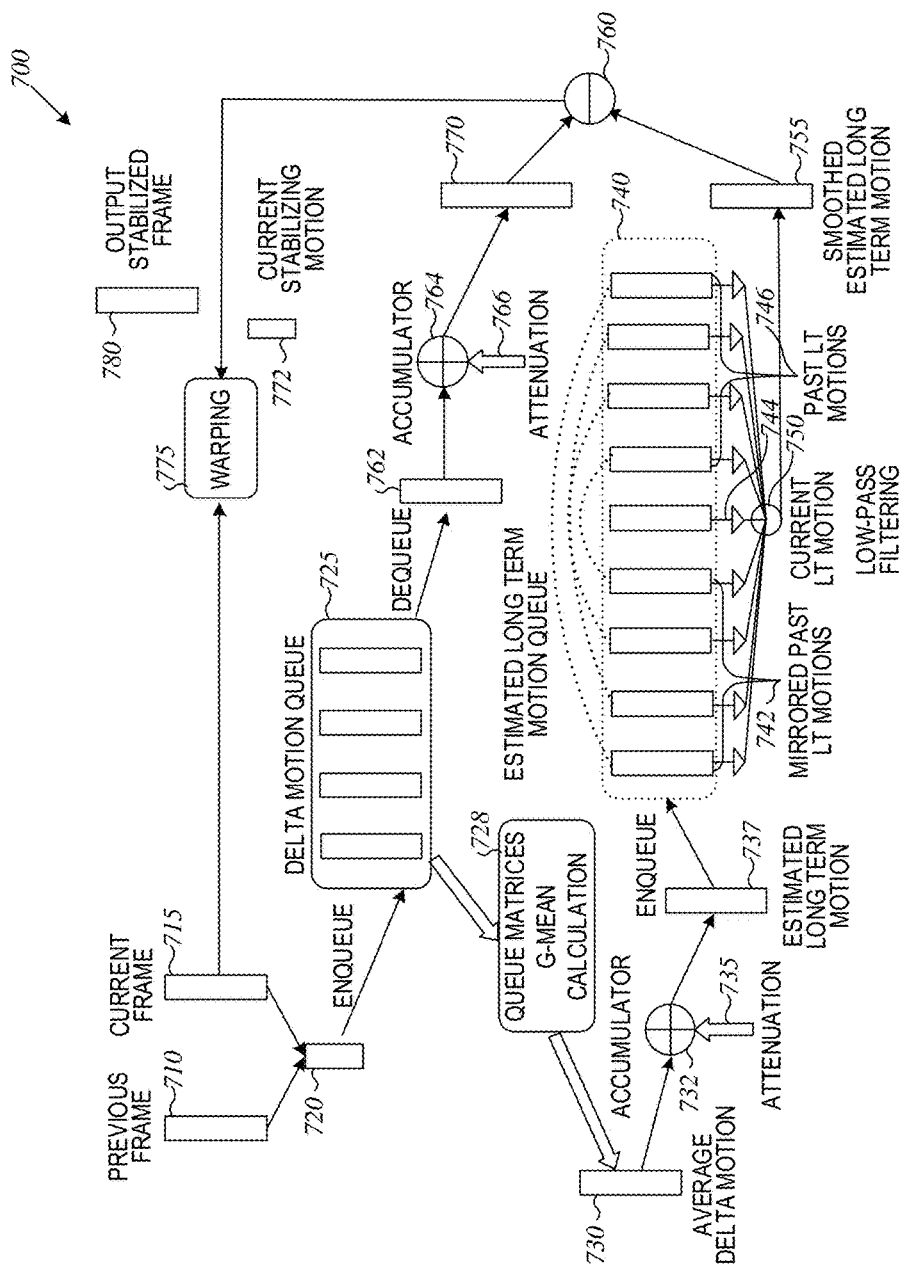
FIG. 7 is a block flow diagram illustrating a low-pass filtering mechanism and the calculation of a stabilization matrix according to an example embodiment.

FIG. 7 is a block flow diagram illustrating a low-pass filtering mechanism and the calculation of the stabilization matrix indicated generally at 700 according to an example embodiment. A previous video frame 710 and a current video frame 715 are used to generate an estimate of the motion 720 between the two frames. The estimate of motion 720 is queued at 725, which may be a storage device for buffering data. As more current frames 715 are received, more estimates of motion 720 are queued at 725. At 728, a G-mean calculation is performed and generates an average estimate of motion represented at 730. At 732, an accumulator receives the average estimates of motion along with an attenuation factor 735 to generate an estimated long term motion 737. The estimated long term motion is queued at 740, and includes mirrored past long term motions 742, a current long term motion 744, and past long term motions 746. Low pass filtering is performed at 750 using the queued long term motions to produce a smoothed estimated long term motion 755.

The smoothed estimated long term motion 755 is provided to block 760 where it is combined with an attenuated motion estimate from queue 725 that has been dequeued. The dequeued motion estimate is attenuated at accumulator 764 with attenuation factor 766, providing the attenuated motion estimate at 770. The combined attenuated motion estimate and smoothed estimated long term motion at 760 is provided as a stabilized motion 772 to a warping function 775. Warping function 775 combines the stabilized motion 772 and the current frame 715 to provide a stabilized frame 780 as an output. The warping function 775 is part of the video frame synthesizer 125 in one embodiment.

Figure 8:
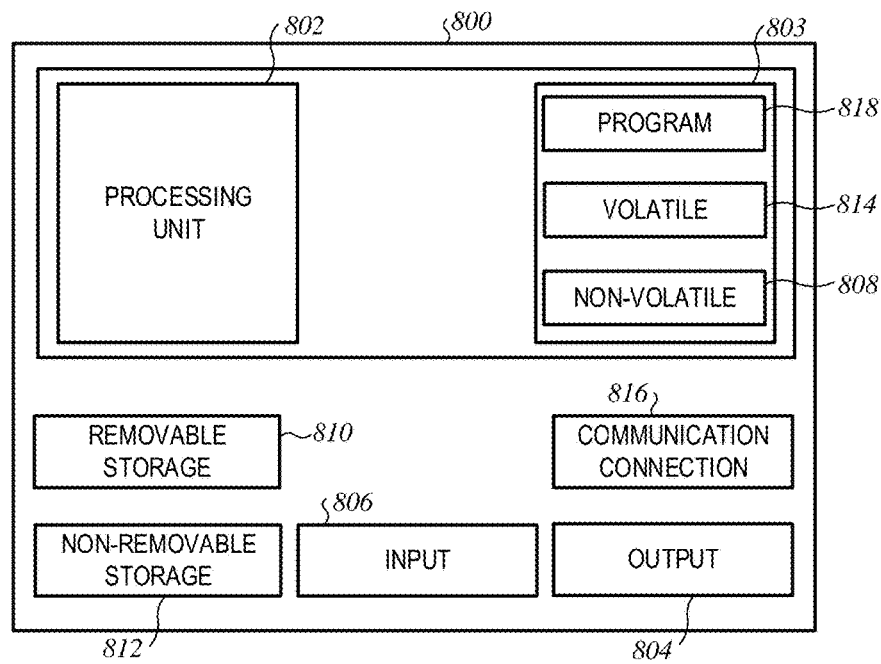
FIG. 8 is a block diagram illustrating circuitry for clients, servers, cloud based resources for implementing algorithms and performing methods according to example embodiments.

FIG. 8 is a block diagram illustrating circuitry for clients, servers, cloud based resources for implementing algorithms and performing methods according to example embodiments. All components need not be used in various embodiments. For example, the clients, servers, and network resources may each use a different set of components, or in the case of servers for example, larger storage devices.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 8. Devices, such as smartphones, tablets, and smartwatches, are generally collectively referred to as mobile devices or user equipment. Further, although the various data storage elements are illustrated as part of the computer 800, the storage may also or alternatively include cloud-based storage accessible via a network, such as the Internet or server based storage.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 802 of the computer 800. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 818 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 800 to provide generic access controls in a COM based computer network system having multiple users and servers. Storage can also include networked storage such as a storage area network (SAN) indicated at 820.

Feature points examples:

In example 1, a method comprises obtaining two consecutive video frames at a global motion estimation function for execution on a processor, wherein the video frames comprise a current video frame and a previous video frame, and estimating motion between the two consecutive video frames by matching a set of feature points common to both video frames, wherein the set of feature points is maintained by tracking a number of feature points in the current video frame, refreshing the feature points if the number of feature points falls below a refresh threshold, and replenishing the feature points if the number of feature points falls below a replenish threshold.

2. The method of example 1 wherein refreshing the feature points comprises discarding the feature points, and deriving a new set of feature points from a previous video frame.

3. The method of any of examples 1-2 wherein replenishing the feature points comprises retaining feature points corresponding to static background, identifying new areas resulting from camera view change, and generating new feature points from the new areas.

4. The method of example 3 wherein the new areas are identified outside neighborhoods of existing feature points.

5. The method of any of examples 3-4 wherein the set of feature points has an initial number of feature points, and wherein a number of new feature points are generated corresponding the initial number of feature points minus the replenish threshold.

6. The method of any of examples 1-5 wherein the set of feature points has an initial number of feature points, wherein the replenish threshold is less than the initial number of features, and wherein the refresh threshold is less than the replenish threshold.

7. The method of example 6 wherein the initial number of feature points is a function of a number of pixels in the frames.

8. The method of any of examples 6-7 wherein the replenish threshold is about one-half the number of initial feature points.

9. The method of any of examples 6-8 wherein the refresh threshold is about $\frac{1}{5}$th to $\frac{1}{6}$th of the number of initial feature points.

10. The method of any of examples 1-9 wherein each of tracking, refreshing, and replenishing is performed by a state machine.

11. The method of any of examples 1-10 and further comprising tracking a duration of the feature points being used without replenishing or refreshing, discarding a portion of the feature points when the duration exceeds a threshold, and replenishing the feature points.

12. The method of example 11 wherein the portion of discarded feature points comprises randomly selected feature points.

13. In example 13, a computer readable storage device has instruction stored thereon for execution by a computer to perform operations. The operations include obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold.

14. The computer readable storage device of example 13 wherein refreshing the feature points includes discarding the feature points, and deriving a new set of feature points from a previous video frame.

15. The computer readable storage device of any of examples 13-14 wherein replenishing the feature points includes retaining feature points corresponding to static background, identifying new areas resulting from camera view change, and generating new feature points from the new areas.

16. The computer readable storage device of any of examples 13-15 wherein the set of feature points has an initial number of feature points, wherein the replenish threshold is about one-half the number of initial feature points and the refresh threshold is about $\frac{1}{5}^{th}$ to $\frac{1}{6}^{th}$ of the number of initial feature points.

17. The computer readable storage device of any of examples 13-16 wherein each of tracking, refreshing, and replenishing is performed by a state machine.

18. The computer readable storage device of any of examples 13-17 and further including tracking a duration of the feature points being used without replenishing or refreshing, discarding a portion of the feature points when the duration exceeds a threshold, wherein the portion of discarded feature points comprises randomly selected feature points, and replenishing the feature points.

In example 19, a system includes processing circuitry and a storage device coupled to the processing circuitry. The processing circuitry is configured to perform operations including obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, and replenishing the feature points if the number of feature points falls below a replenish threshold.

20. The system of example 13 wherein refreshing the feature points includes discarding the feature points and deriving a new set of feature points from a previous video frame. Replenishing the feature points includes retaining feature points corresponding to static background, identifying new areas resulting from camera view change, and generating new feature points from the new areas, wherein the set of feature points has an initial number of feature points, wherein the replenish threshold is less than the initial number of features, and wherein the refresh threshold is less than the replenish threshold.

Motion filter examples are now presented and may be combined with any of the previous examples:

In example 1, a method includes buffering a homogenous transformation of global motion between pairs of consecutive frames of video from a camera, calculating a geometric mean of the buffered motions, and estimating intentional camera trajectory based on the geometric mean.

2. The method of example 1 wherein the homogenous transformation comprises an affine transformation matrix.

3. The method of any of examples 1-2 wherein the pairs of frames of video comprise a current video frame and multiple past video frames.

4. The method of any of examples 1-3 wherein a number of buffered global motions comprises a length of a filter which is a power of two, and wherein the length of the filter is adapted to account for large intentional camera trajectories.

5. The method of example 4 wherein the filter length adapts from 128 to 1.

6. The method of any of examples 4-5 and further comprising calculating a stabilization matrix from the geometric means.

7. The method of example 6 and further including reducing the length of the filter by half if the stabilization matrix is not within a threshold and recalculating the geometric mean based on the reduced length of the filter.

8. The method of example 7 and further comprising repeating the geometric mean calculation, stabilization matrix calculation, reducing the length of the filter by half if the stabilization matrix is not within a threshold until the filter length is not greater than one.

9. The method of any of examples 7-8 and further comprising if the stabilization matrix is within the threshold, doubling the filter size.

10. The method of any of examples 7-9 wherein a forgetting factor representative of a speed that a scene moves out of view is used to perform drift compensation on the stabilization matrix that is within the threshold.

11. The method of example 10 and further comprising attenuating the stabilization matrix to accommodate maximum loss in output video spatial resolution.

12. The method of any of examples 1-11 wherein the homogenous transformation of global motion comprises an affine transformation:

$$\begin{bmatrix} a & b & x \\ c & d & y \\ 0 & 0 & 1 \end{bmatrix}$$

where coefficients a and d correspond to a scaling factor of the transformation, coefficients c and d determine the amount of rotation, and coefficients x and y represent horizontal and vertical translations respectively.

In example 13, a computer readable storage device has instruction stored thereon for execution by a computer to perform operations. The operations include buffering a homogenous transformation of global motion between pairs of consecutive frames of video from a camera, calculating a geometric mean of the buffered motions, and estimating intentional camera trajectory based on the geometric mean.

14. The computer readable storage device of example 13 wherein the homogenous transformation of global motion comprises an affine transformation:

$$\begin{bmatrix} a & b & x \\ c & d & y \\ 0 & 0 & 1 \end{bmatrix}$$

where coefficients a and d correspond to a scaling factor of the transformation, coefficients c and d determine the amount of rotation, and coefficients x and y represent horizontal and vertical translations respectively.

15. The computer readable storage device of any of examples 13-14 wherein a number of buffered global motions comprises a length of a filter which is a power of two, and wherein the length of the filter is adapted to account for large intentional camera trajectories.

16. The computer readable storage device of example 15 and further comprising calculating a stabilization matrix from the geometric means.

17. The computer readable storage device of example 16 and further including reducing the length of the filter by half if the stabilization matrix is not within a threshold, and recalculating the geometric mean based on the reduced length of the filter.

18. The computer readable storage device of example 17 and further comprising repeating the geometric mean calculation, stabilization matrix calculation, reducing the length of the filter by half if the stabilization matrix is not within a threshold until the filter length is not greater than one.

In example 19, a system includes processing circuitry and a storage device having a buffer coupled to the processing circuitry. The processing circuitry is configured to perform operations including buffering a homogenous transformation of global motion between pairs of consecutive frames of video from a camera, calculating a geometric mean of the buffered motions, and estimating intentional camera trajectory based on the geometric mean.

20. The system of example 19 wherein the homogenous transformation of global motion comprises an affine transformation:

$$\begin{bmatrix} a & b & x \\ c & d & y \\ 0 & 0 & 1 \end{bmatrix}$$

where coefficients a and d correspond to a scaling factor of the transformation, coefficients c and d determine the amount of rotation, and coefficients x and y represent horizontal and vertical translations respectively, and wherein a number of buffered global motions comprises a length of a filter which is a power of two, and wherein the length of the filter is adapted to account for large intentional camera trajectories.

Combined feature points and motion filter example:

In example 1, a method includes obtaining two consecutive video frames at a global motion estimation function for execution on a processor, wherein the video frames comprise a current video frame and a previous video frame, and estimating motion between the two consecutive video frames by matching a set of feature points common to both video frames. The set of feature points is maintained by tracking a number of feature points in the current video frame, refreshing the feature points if the number of feature points falls below a refresh threshold, replenishing the feature points if the number of feature points falls below a replenish threshold, buffering a homogenous transformation of the global motion estimation, calculating a geometric mean of the buffered motions, and estimating intentional camera trajectory based on the geometric mean.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   obtaining two consecutive video frames at a global motion estimation function for execution on a processor, wherein the video frames comprise a current video frame and a previous video frame; and
   estimating motion between the two consecutive video frames by matching a set of feature points common to both video frames, wherein the set of feature points is maintained by:
   tracking a number of feature points in the current video frame;
   refreshing the feature points if the number of feature points falls below a refresh threshold; and
   replenishing the feature points if the number of feature points falls below a replenish threshold, the replenishing including retaining features points corresponding to static background and generating new feature points from new areas identified outside of a neighborhood of the feature points.

2. The method of claim 1 wherein refreshing the feature points comprises:
   discarding the feature points; and
   deriving a new set of feature points from a previous video frame.

3. The method of claim 1 wherein replenishing the feature points further comprises:
   identifying the new areas resulting from camera view change.

4. The method of claim 3 wherein the set of feature points has an initial number of feature points, and wherein a number of new feature points are generated corresponding the initial number of feature points minus the replenish threshold.

5. The method of claim 1 wherein the set of feature points has an initial number of feature points, wherein the replenish threshold is less than the initial number of features, and wherein the refresh threshold is less than the replenish threshold.

6. The method of claim 5 wherein the initial number of feature points is a function of a number of pixels in the frames.

7. The method of claim 5 wherein the replenish threshold is about one-half the number of initial feature points.

8. The method of claim 5 wherein the refresh threshold is $\frac{1}{5}^{th}$ to $\frac{1}{6}^{th}$ of the number of initial feature points.

9. The method of claim 1 wherein each of tracking, refreshing, and replenishing is performed by a state machine.

10. The method of claim 1 and further comprising:
tracking a duration of the feature points being used without replenishing or refreshing;
discarding a portion of the feature points when the duration exceeds a threshold; and
replenishing the feature points with newly tracked feature points.

11. The method of claim 10 wherein the portion of discarded feature points comprises randomly selected feature points.

12. A non-transitory computer readable medium storing computer instructions, that when executed by one or more processors, cause the one or more processors to perform the steps of:
obtaining two consecutive video frames at a global motion estimation function for execution on a processor, wherein the video frames comprise a current video frame and a previous video frame; and
estimating motion between the two consecutive video frames by matching a set of feature points common to both video frames, wherein the set of feature points is maintained by:
tracking a number of feature points in the current video frame;
refreshing the feature points if the number of feature points falls below a refresh threshold; and
replenishing the feature points if the number of feature points falls below a replenish threshold, the replenishing including retaining features points corresponding to static background and generating new feature points from new areas identified outside of a neighborhood of the feature points.

13. The non-transitory computer readable medium of claim 12 wherein refreshing the feature points causes the one or more processors to further perform the steps of:
discarding the feature points; and
deriving a new set of feature points from a previous video frame.

14. The non-transitory computer readable medium of claim 12 wherein replenishing the feature points causes the one or more processors to further perform the step of:
identifying the new areas resulting from camera view change.

15. The non-transitory computer readable medium of claim 12 wherein the set of feature points has an initial number of feature points, wherein the replenish threshold is about one-half the number of initial feature points and the refresh threshold is $\frac{1}{5}^{th}$ to $\frac{1}{6}^{th}$ of the number of initial feature points.

16. The non-transitory computer readable medium of claim 12 wherein each of tracking, refreshing, and replenishing is performed by a state machine.

17. The non-transitory computer readable medium of claim 12 and causes the one or more processors to further perform the steps of:
tracking a duration of the feature points being used without replenishing or refreshing;
discarding a portion of the feature points when the duration exceeds a threshold, wherein the portion of discarded feature points comprises randomly selected feature points; and
replenishing the feature points with newly tracked feature points.

18. A system comprising:
a non-transitory memory storage comprising instructions; and
one or more processors in communication with the memory, wherein the one or more processors execute the instructions to:
obtain two consecutive video frames at a global motion estimation function for execution on a processor, wherein the video frames comprise a current video frame and a previous video frame; and
estimate motion between the two consecutive video frames by matching a set of feature points common to both video frames, wherein the set of feature points is maintained by:
tracking a number of feature points in the current video frame;
refreshing the feature points if the number of feature points falls below a refresh threshold; and
replenishing the feature points if the number of feature points falls below a replenish threshold, the replenishing including retaining features points corresponding to static background and generating new feature points from new areas identified outside of a neighborhood of the feature points.

19. The system of claim 18 wherein refreshing the feature points causes the one or more processors to further execute the instructions to:
discard the feature points; and
derive a new set of feature points from a previous video frame, and wherein replenishing the feature points comprises:
retaining feature points corresponding to static background;
identifying new areas resulting from camera view change; and
generating new feature points from the new areas, wherein the set of feature points has an initial number of feature points, wherein the replenish threshold is less than the initial number of features, and wherein the refresh threshold is less than the replenish threshold.

* * * * *